United States Patent
Bielak

(10) Patent No.: US 8,958,129 B1
(45) Date of Patent: Feb. 17, 2015

(54) FORMING IMAGE ON MEDIA USING SCREENING TILE WITH THRESHOLDS DETERMINED BY DISPLACING CENTER OF EACH CELL SPOT FUNCTION ACCORING TO DISPLACEMENT VECTOR AND DITHER CURVE

(71) Applicant: Richard R. Bielak, Port Coquitlam (CA)

(72) Inventor: Richard R. Bielak, Port Coquitlam (CA)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 14/253,905

(22) Filed: Apr. 16, 2014

(51) Int. Cl.
*H04N 1/405* (2006.01)
*H04N 1/409* (2006.01)
*G06K 15/02* (2006.01)

(52) U.S. Cl.
CPC ........ *G06K 15/1881* (2013.01); *G06K 15/1876* (2013.01)
USPC ........ 358/3.14; 358/3.17; 358/3.19; 358/3.26

(58) Field of Classification Search
None
See application file for complete search history.

(56) References Cited

U.S. PATENT DOCUMENTS

| | | | | |
|---|---|---|---|---|
| 6,445,465 B1 * | 9/2002 | Samworth | ...... | 358/1.9 |
| 2004/0130753 A1 * | 7/2004 | Crounse | ...... | 358/3.12 |
| 2004/0160643 A1 * | 8/2004 | Sugizaki | ...... | 358/3.06 |
| 2005/0155502 A1 * | 7/2005 | Shigeta | ...... | 101/170 |
| 2005/0157347 A1 * | 7/2005 | Dewitte | ...... | 358/536 |
| 2005/0219628 A1 * | 10/2005 | Yasutomi et al. | ...... | 358/3.16 |
| 2009/0034008 A1 * | 2/2009 | Croft et al. | ...... | 358/3.19 |

FOREIGN PATENT DOCUMENTS

JP 2003134337 A * 5/2003 ............ H04N 1/405

* cited by examiner

*Primary Examiner* — Scott A Rogers
(74) *Attorney, Agent, or Firm* — Nelson Adrian Blish

(57) ABSTRACT

A method of forming a screened image includes providing a contone image, a screening tile structure of M by N cells, a dither magnitude curve, a spot function for each of the cells in the screening tile, and a displacement vector for each of the cells in the screening tile. Threshold values for each of the cells are constructed by displacing the center of each cell spot function according to the displacement vectors and according to the dither curve. A halftone image is constructed from the contone image and the screening tile by comparing value of each pixel from the contone image to a corresponding threshold value from the screening tile. If the pixel value exceeds the threshold value set a corresponding pixel in the halftone image to one otherwise set the corresponding pixel in the halftone image to zero.

14 Claims, 14 Drawing Sheets

FORMING IMAGE ON MEDIA USING SCREENING TILE WITH THRESHOLDS DETERMINED BY DISPLACING CENTER OF EACH CELL SPOT FUNCTION ACCORING TO DISPLACEMENT VECTOR AND DITHER CURVE

CROSS REFERENCE TO RELATED APPLICATIONS

Reference is made to commonly-assigned copending U.S. patent application Ser. No. 14/253,910, filed Apr. 16, 2014, entitled PRINTING AN IMAGE ON A SUBSTRATE, by Bielak; the disclosure of which is incorporated herein.

FIELD OF THE INVENTION

The present invention relates to methods and apparatus for image reproduction systems characterized by three-dimensional features imaged on a flexographic plate.

BACKGROUND OF THE INVENTION

Halftone screening is a printing technique that reproduces continuous tone images by using dots that vary in size or spacing. Halftone screening is used by many different printing technologies. The invention disclosed here is particularly valuable for screening applied to flexographic printing.

There are two common halftone screening methods used in the industry: Amplitude Modulation (AM) screening and Frequency Modulation (FM) screening. The most common screening method is AM, which positions dots on a fixed grid and varies the dot size according to the tone of the image. Various dot shapes can be used but round, elliptical, and Euclidian are the most common. FIG. 1A shows a typical AM screen with dots 104 positioned on the grid.

The principal disadvantage of AM screening for flexographic printing is the size of the smallest printing dot. The smallest relief dot that can be reliably created on a plate is about 20 to 30 microns in diameter. Any smaller and the dot may not form properly, leading to distortion and scum dot formation. In addition, the ink transferred from the plate to the substrate spreads out past the edge of the dot, increasing the dot diameter by another 20 to 30 microns. This results in a high minimum tonal value. For example, a 150 dpi screen will have minimum tonal value of about 10%.

A second method, often called FM screening, avoids a regular grid. Instead a stochastic process is used to place the dots. Initially the dots are of fixed size and the tone is increased by adding dots to the image. After a certain density is reached, the algorithm switches from dot addition to dot growth. The placement algorithm attempts to preferentially reduce the spatial frequency components in the screen to which the eye is most sensitive. FIG. 1B shows a typical FM screen with dot 108 positioned on the plate.

The main disadvantage of this method is the residual noise that is apparent in the mid-tones of the image. Mid-tones can be roughly defined as the tonal range from about 25% to 75% tone. This noise is often made worse when different color image separations are superimposed during the printing process. In this mid-tone range, AM screening usually out-performs FM screens.

The principal advantage of FM screens is their ability to achieve lower tonal values, when compared to AM screens, by continually removing dots from the screen. These lower tonal values in the range of zero to a few percent are referred to as the highlights. Similarly, the last few percent of tonal values up to 100% tone are referred to as the shadows. An ideal halftone screen would have the low noise characteristic of AM screens in the mid-tones combined with the extended tonal range of FM screens in the highlights. Several methods described in the prior art attempt to achieve this result, but with mixed results. There exists a need to create a hybrid screen without introducing any unwanted side effects.

In the prior art, the most straight forward method of extending the tonal range of an AM screen is to start removing dots after the minimum dot size has been reached. A stochastic algorithm is used to choose the order in which the dots are removed. The goal of the algorithm is to minimize noise in the low spatial frequencies of the screen. Some clustering of the remaining dots may be required to prevent scum dots from forming on the plate. FIG. 1C shows how this method is used in the highlight area of a vignette. Area 112 shows dots are removed from the AM grid. What is apparent from the figure is that the dot dropout causes voids 112 in the halftone screen that are easily visible. Many customers find such voids objectionable.

Better results can be achieved when a hybrid of AM and FM screening is used. A stochastic screen is used for the highlights areas while, in the mid-tones, an AM screen is deployed for noise reduction. There is an abrupt transition from FM to AM screen at the tone when all the AM cells are filled with a halftone dot of the minimum size. The algorithm ensures that a separation is maintained between AM and FM dots. This algorithm is an improvement over the simpler on-grid algorithm, however, it does sometimes suffer from a visible line appearing between the AM and FM regions. This can manifest as either a white line or a dark line between the regions. FIG. 1D shows an example of this type of screen. The voids 116 are not as apparent in the highlights A further enhancement is to add a transition region between the FM screening in the highlights and the AM screening over the remainder of the tonal range. In this transition region, the screening method slowly changes from FM to AM and the average position of the halftone dots migrate toward the center of the halftone cell. FIG. 1E illustrates an example of such an implementation.

SUMMARY OF THE INVENTION

Briefly, according to one aspect of the present invention a method of forming a screened image includes providing a contone image, a screening tile structure of M by N cells, a dither magnitude curve, a spot function for each of the cells in the screening tile, and a displacement vector for each of the cells in the screening tile. Threshold values for each of the cells are constructed by displacing the center of each cell spot function according to the displacement vectors and according to the dither curve. A halftone image is constructed from the contone image and the screening tile by comparing value of each pixel from the contone image to a corresponding threshold value from the screening tile. If the pixel value exceeds the threshold value set a corresponding pixel in the halftone image to one otherwise set the corresponding pixel in the halftone image to zero.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

In the following detailed description, numerous specific details are set forth in order to provide a thorough understanding of the disclosure. However, it will be understood by those skilled in the art that the teachings of the present disclosure may be practiced without these specific details. In other instances, well-known methods, procedures, components and circuits have not been described in detail so as not to obscure the teachings of the present disclosure.

While the present invention is described in connection with one of the embodiments, it will be understood that it is not intended to limit the invention to this embodiment. On the contrary, it is intended to cover alternatives, modifications, and equivalents as covered by the appended claims.

Figure 1A:
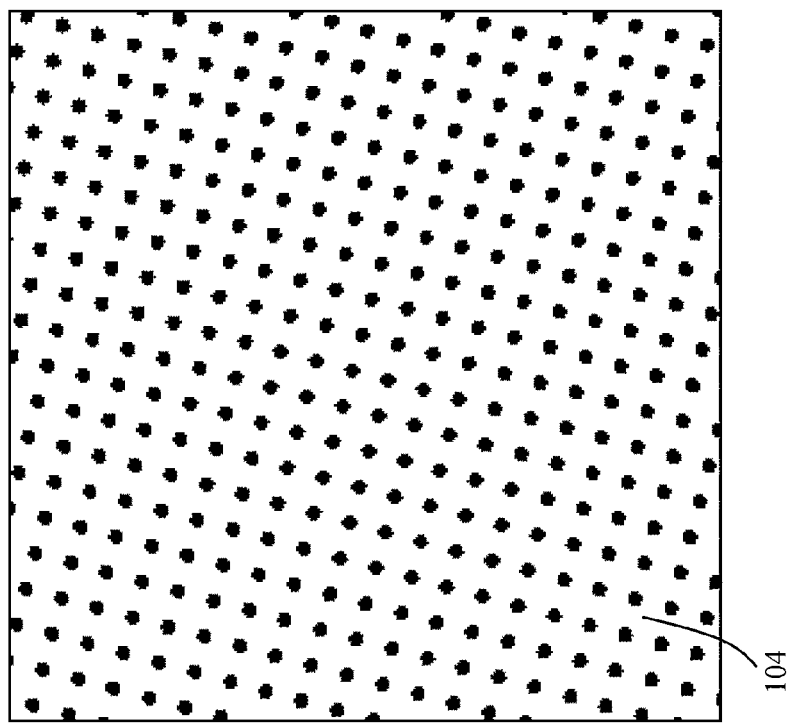
FIG. 1A represents, in diagrammatic form, a prior art AM screen sample.
Figure 1B:
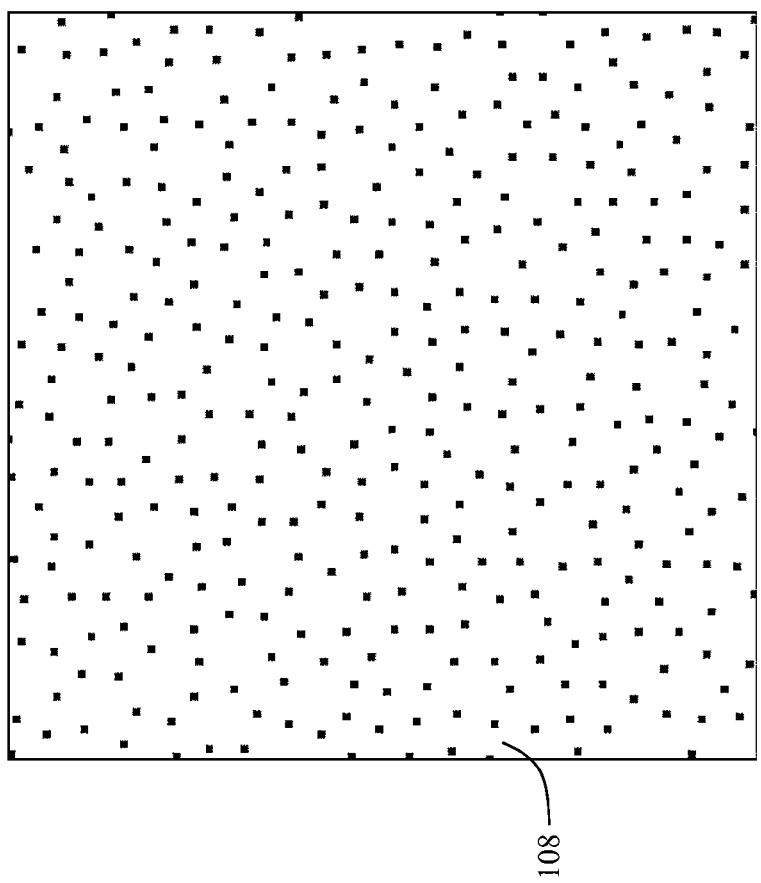
FIG. 1B represents, in diagrammatic form, a prior art FM screen sample.
Figure 1C:
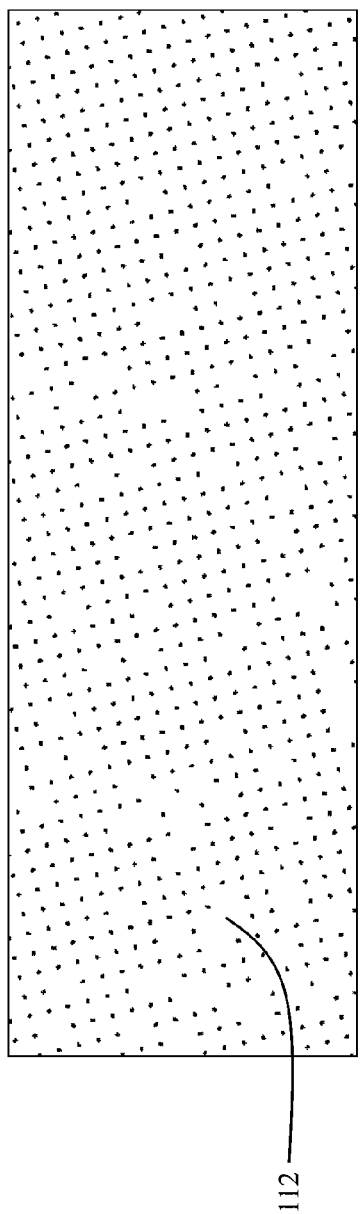
FIG. 1C represents, in diagrammatic form, a prior art dot removal from an AM screen.
Figure 1D:
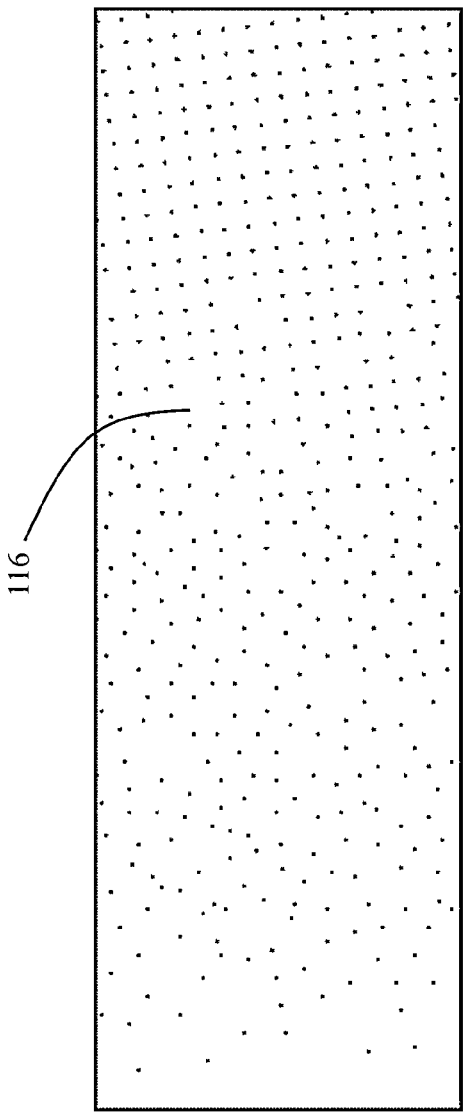
FIG. 1D represents, in diagrammatic form, a prior art abrupt hybrid screen.
Figure 1E:
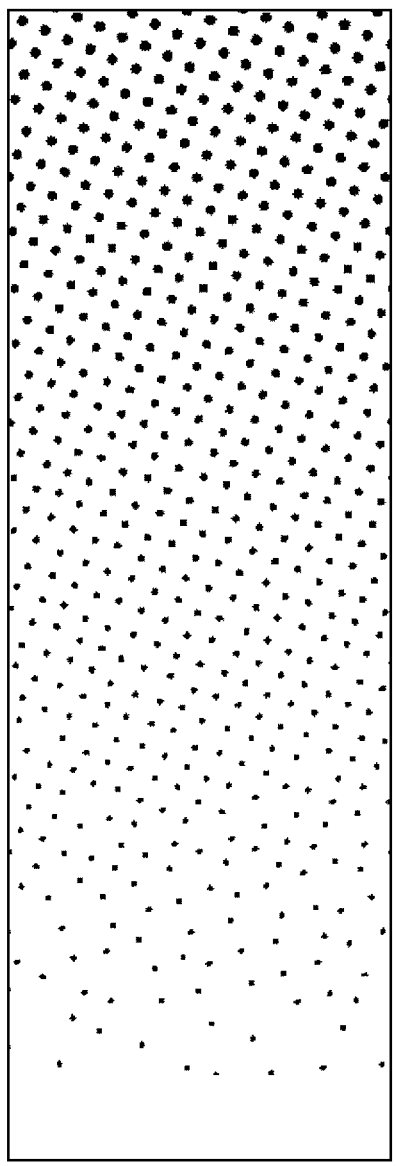
FIG. 1E represents, in diagrammatic form, a prior art transition from FM to AM screen.
Figure 2:
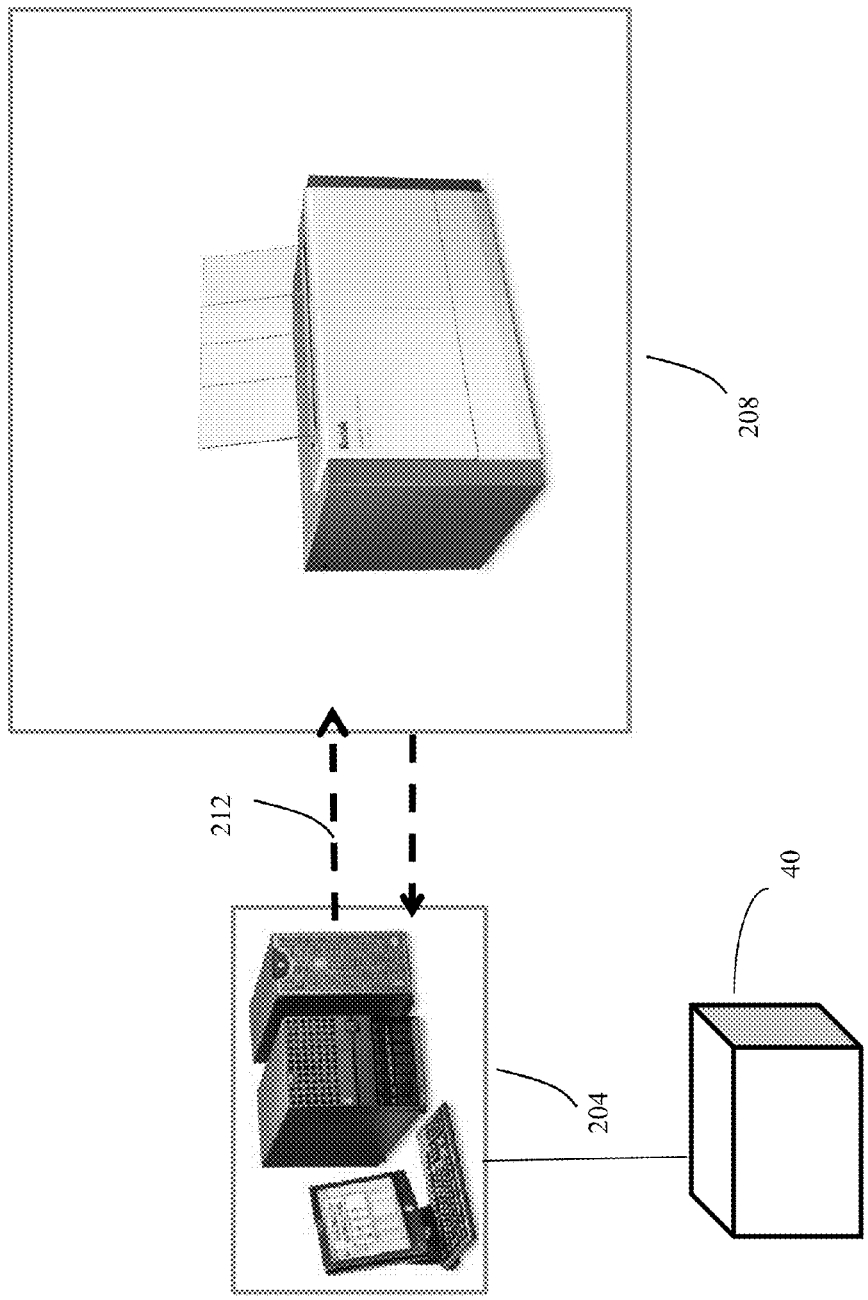
FIG. 2 represents, in diagrammatic form, a prior art digital front end driving an imaging device.

FIG. 2 shows an imaging device 208. The imaging device is driven by a digital front end (DFE) 204. The DFE receives printing jobs in a digital form from desktop publishing (DTP) systems usually comprising a computer 40, and renders the digital information for imaging. The rendered information and imaging device control data are communicated between DFE 204 and imaging device 208 over interface line 212.

Figure 3:
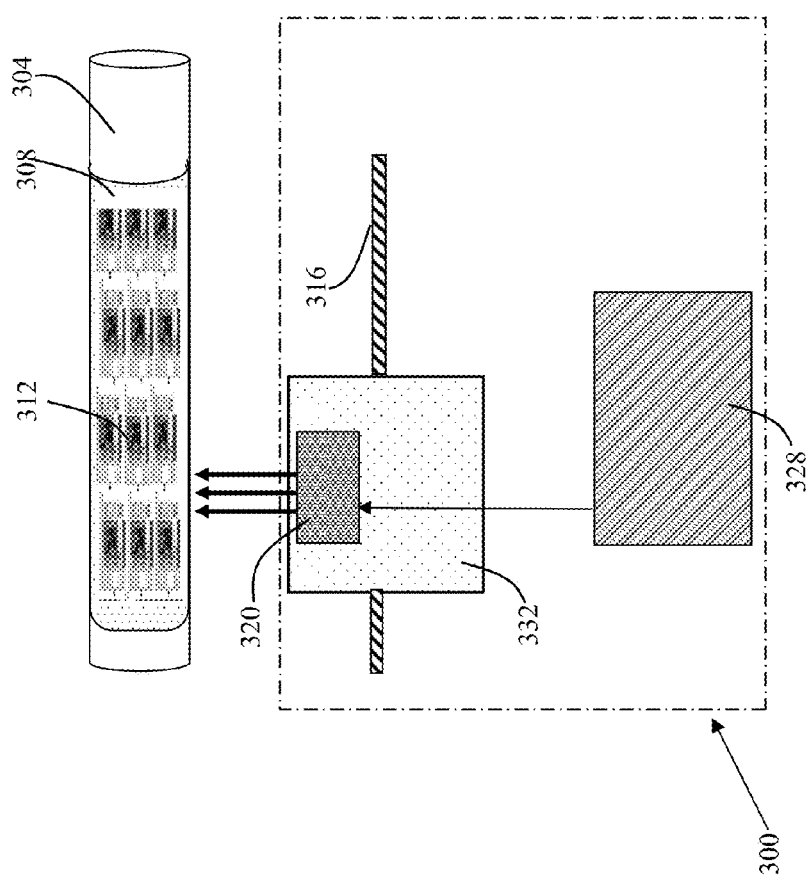
FIG. 3 represents, in diagrammatic form, a prior art laser imaging head situated on the imaging carriage imaging on a plate mounted on an imaging cylinder.

FIG. 3 shows an imaging system 300. The imaging system 300 includes an imaging carriage 332 an imaging head 320 is mounted, imaging head 320 are controlled by controller 328. The imaging head 320 is configured to image on a substrate 308 (such as film or plate) mounted on a rotating cylinder 304. The carriage 332 is adapted to move substantially in parallel to cylinder 304 guided by an advancement screw 316. The substrate 308 is imaged by imaging head 320 to form an imaged data 312 on substrate 308.

Figure 4:
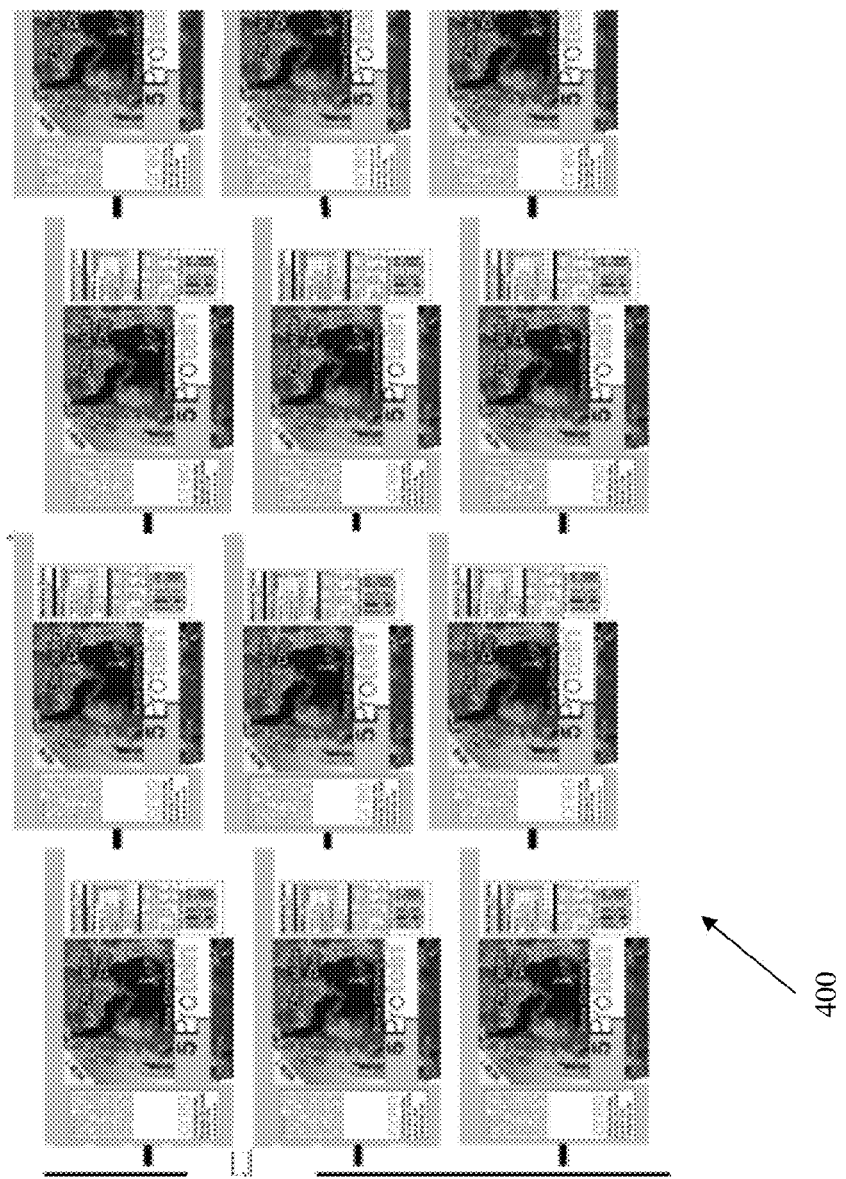
FIG. 4 shows a prior art halftone rendered image.
Figure 5:
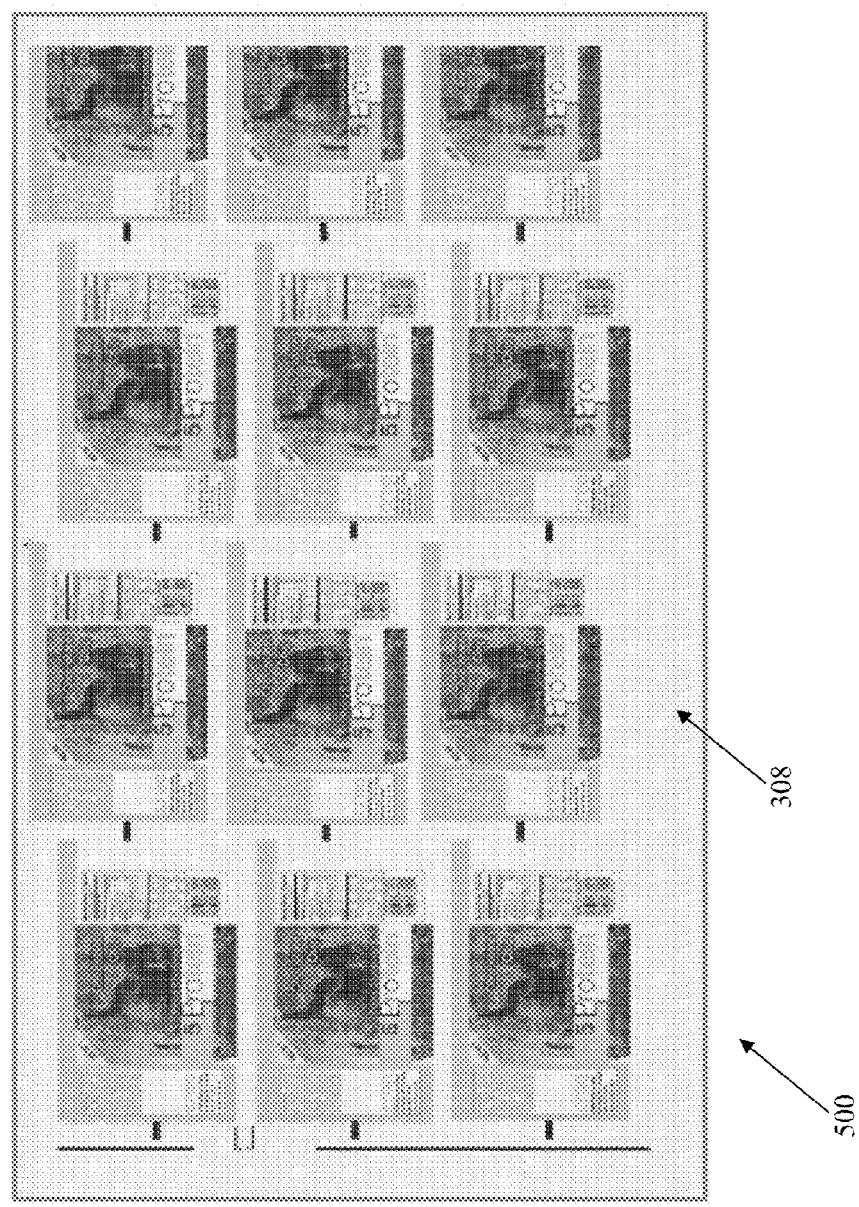
FIG. 5 shows a prior art rendered image on flexographic plate.

FIG. 4 shows a halftone rendered image 400. The rendered image 400 was prepared by DFE 204, to be further imaged on the substrate 308. FIG. 5 shows rendered image 400 imaged by imaging head 420 on substrate 308 forming an imaged substrate 500.

For halftone screens in flexographic printing, the best results are achieved if the highlights areas 604 are predominantly screened using stochastic based methods and the dots in the mid-tones 612 area are predominantly on a regular grid. This is the objective of the current invention.

Figure 6:
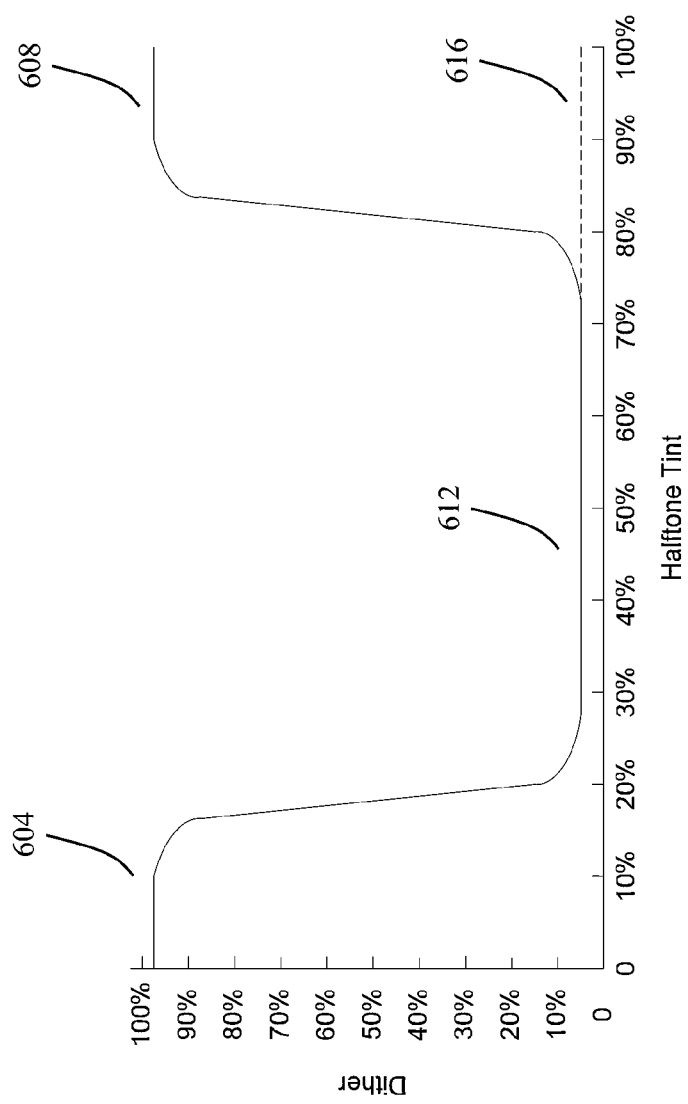
FIG. 6 shows the magnitude of the dither as a function of tonal value in a typical application.

The present invention comprises an AM screen wherein the center of the halftone dot is dithered from its central location. The magnitude of the dither is a function of the tonal value. FIG. 6 shows the magnitude of the dither as a function of tonal value in a typical application. The curve can take many shapes but is generally high in the highlight areas 604 and low in the mid-tone areas 612. A dashed line 616 is shown extending the low value into the shadows 608. Alternatively, the shadow areas 608 can also be highly dithered since they suffer from many of the same problems as the highlights 604.

The magnitude of the dither in the highlight and shadows approaches 100%. This implies that the center of the dot can be located almost anywhere in the halftone cell. As such, the spatial frequency response of the screen is very similar to that of an FM screen. The dot displacement vectors are chosen to minimize low frequency spatial components in the screen.

The mid-tones contain a small amount of dither. A slight dither to the position of the dot center in the halftone spot function can prevent dots from touching at the same time in a tonal vignette. When dots touch there is often a step change in the amount of ink laid down. This can cause a visible artifact in the image. Smearing the tone at which contact occurs can mitigate this problem. The dither can also break up any periodic patterns that can occur in the shape or size of the halftone dot during the screening process. Such repeat patterns may cause moiré artifacts to appear in an image.

Figure 7:
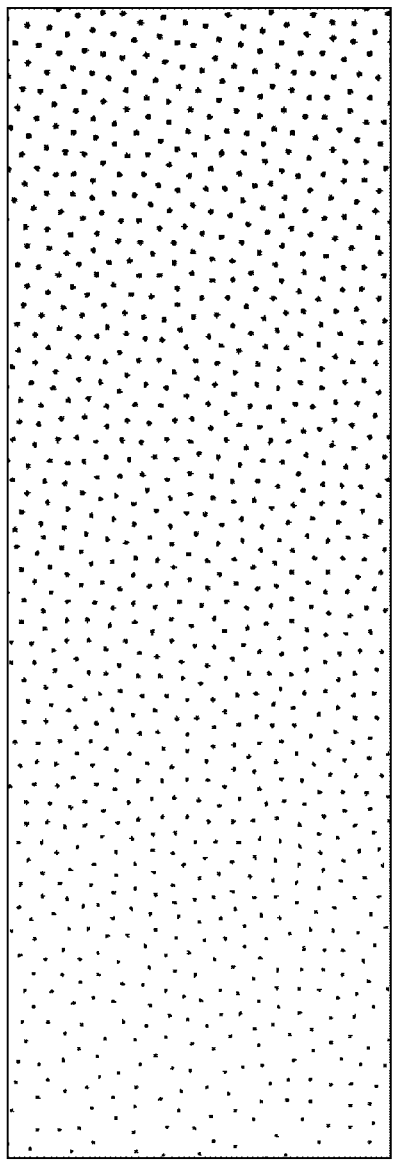
FIG. 7 shows a sample of a screened vignette with the method described in the invention.

The prior art uses one type of screening method in the highlights (and shadows) and another screening method in the mid-tones. By contrast, the present invention uses the same screening method throughout the entire tonal range. Only the magnitude of the applied dither changes as a function of tonal value. FIG. 7 shows a sample of a screened vignette created with the method described in the invention.

Figure 9:
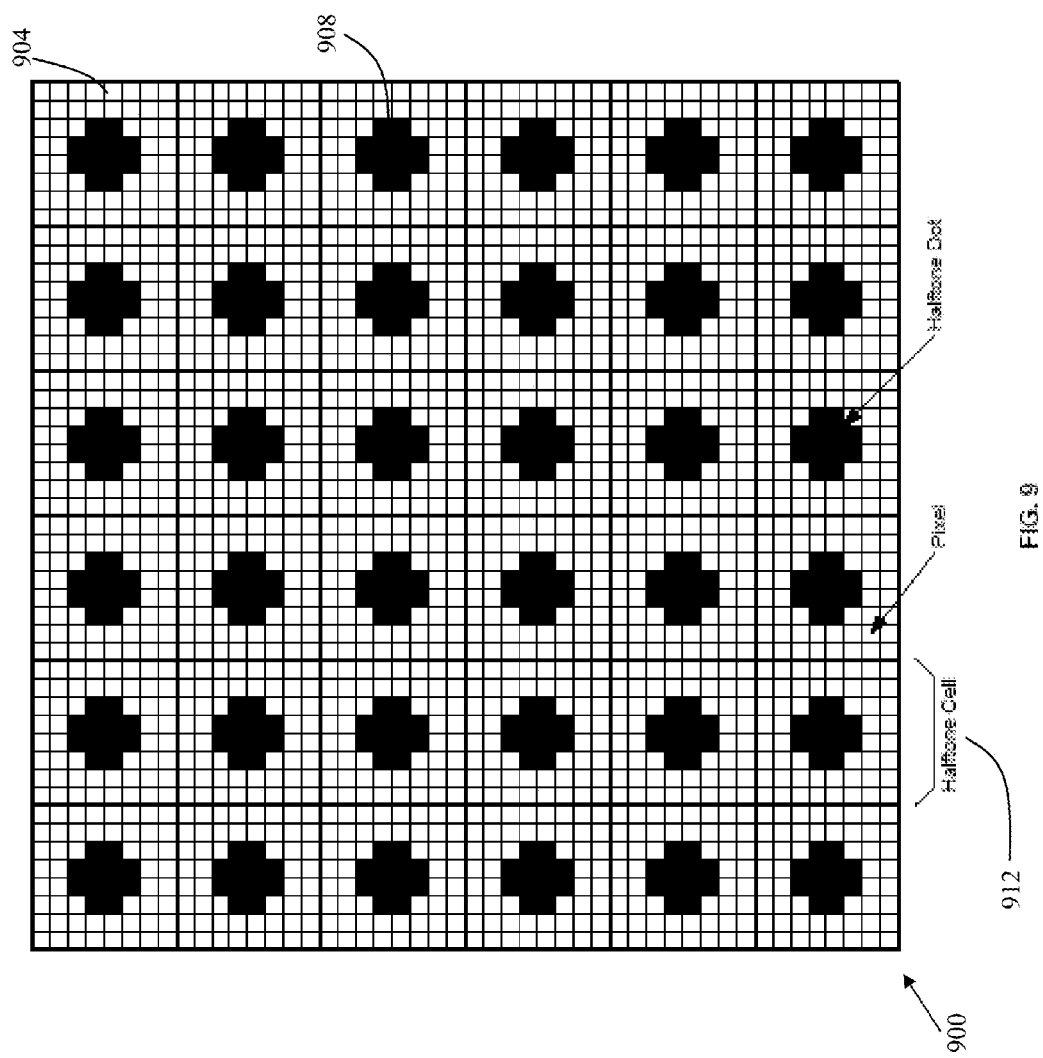
FIG. 9 shows a halftone screened tile.

In the preferred embodiment, the FM screen is constructed as a screening tile 900 with a width and length that is an integral number of halftone cells 912 as shown in FIG. 9. The tile is also composed of an integral number of pixels 904. These pixels are the smallest addressable picture elements of the imaging device. The halftone dots 908 within the halftone cells are formed by setting adjacent groups of pixels to the one state from the zero state. (On the printing plate, set pixels transfer ink to the substrate, whereas, clear pixels do not). Typically, the tile is not large enough to cover the entire area of the halftone image and the tile must be repeated, in both dimensions, to achieve the desired coverage.

The FM screen is constructed using the following procedure. One minimum size halftone dot is randomly placed in each halftone cell of the tile. This initial placement creates a tile with a white noise characteristic that contains visibly objectionable artifacts. To improve the screen, the position of the dots are adjusted in an iterative manner to reduce the low frequency components while suppressing the tendency of the dots to migrate toward the center of the halftone cell. The optimization algorithm takes into account the repeating nature of the tile to ensure that no artifacts are created at tile boundaries.

Because the dots are restricted to staying within the boundaries of their halftone cell in the present invention, the resulting screen is not a pure FM screen. FM screens, on average, will have one dot per cell but an individual cell may contain 0, 1, 2, or more dots. For this reason, the frequency response of screen tile will always retain a small AM component. From the resulting FM tile, a set of displacement vectors are extracted. These vectors are the distance and direction that each halftone dot is displaced from the center of its corresponding halftone cell.

Figure 10:
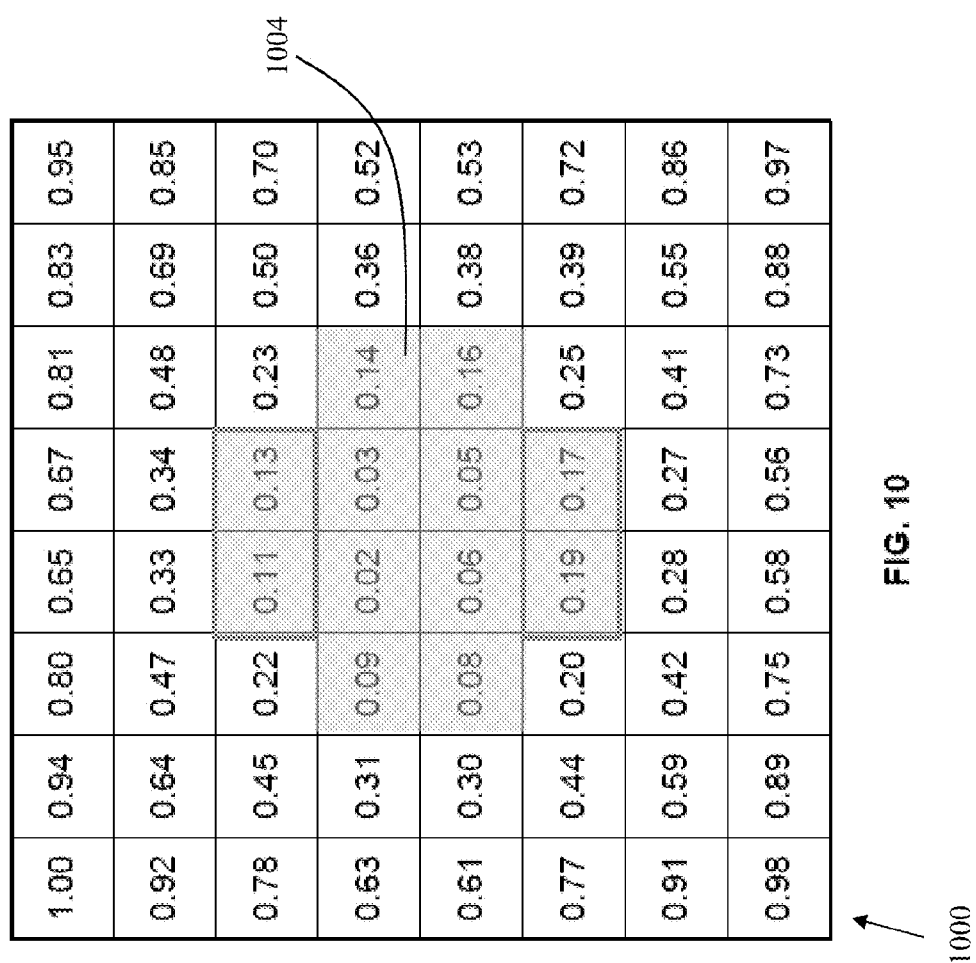
FIG. 10 shows constructed threshold values in a cell of a screening tile.

Threshold values can now be constructed for each cell in the screening tile from the displacement vectors, the dither magnitude curve (FIG. 6), and a desired spot function. The screening tile containing threshold values is a common method of implementing a halftone screen. Each pixel in the continuous tone image is compared with a corresponding threshold value in the tile. If the image value exceeds the threshold value then the corresponding pixel in the halftone image is set. FIG. 10 shows how threshold values in a cell of a screening tile 1000 might be configured for a single halftone cell 912 in the screening tile 900. The other cells in the tile would be configured similarly. These threshold values are compared against the tonal values of the corresponding pixels in the contone image and if the threshold value is less than or equal to the image value then the corresponding pixel in the halftone image is set. FIG. 9 shows the result of the thresholding operation for the case where the contone image area that the tile covers is a 19% tone as is shown by numeral 1004 (12 of the 64 pixels in each halftone cell are set)

A conventional AM screen threshold values for a cell in a screening tile is created by first selecting a spot function. A spot function defines the order that pixels are turned on within a halftone cell controlling the dot shape. One common spot function produces a circular dot over the entire tonal range, another function transitions from a circular shape to a checkerboard at the midtone and back to circular in the shadows. The dots start growing from the center of the halftone cell and remain centered on the middle of the cell. The threshold values for a single cell are created by selecting for each successive threshold value the next pixels as defined by the spot functions and inserting the threshold value into those locations.

The current invention departs from the conventional AM array construction method by the use of the direction vectors and the dither magnitude curve (FIG. 6) to modify the spot function. The threshold values for a cell are created by selecting for each successive threshold value the next pixels in the contone image as defined by the modified spot functions and inserting the threshold value into those locations. The modified spot functions are derived from the original spot functions by displacing the center of the original spot function from the center of the halftone cell using values calculated from the product of the displacement vectors and the dither magnitude curve.

In a conventional AM screen, as the tone increases, pixels are set and stay set. This requires only one threshold value per location in the tile. Because the magnitude of the displacement of the halftone dots changes as a function of tonal value in the current invention, pixels may toggle from zero to one and back to zero again. Therefore, multilevel threshold values are implemented for this invention.

Figure 8:
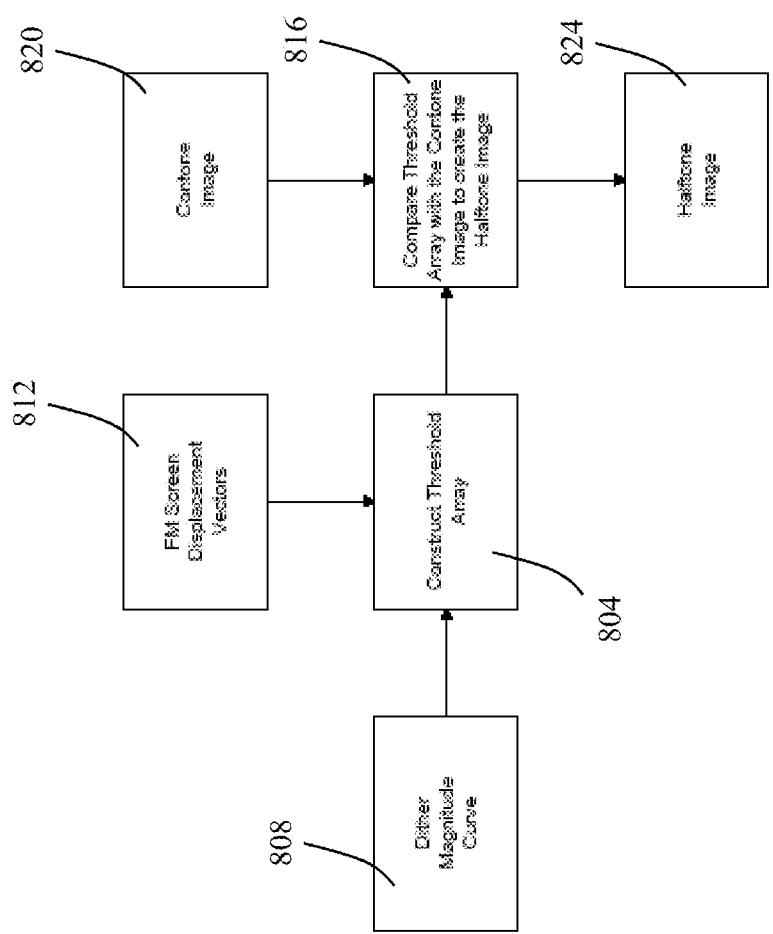
FIG. 8 shows a block diagram of the halftone screening process according to the current invention.

FIG. 8 depicts a flow diagram to generate a halftone image according to the current invention. Cell threshold values 804 are constructed according to the extracted displacement vectors 812 from the FM tile and the dither magnitude curve 808. A halftone image 824 will be generated from a supplied contone image 820 by comparing the constructed threshold values 816 elements to the contone image pixels.

The invention has been described in detail with particular reference to certain preferred embodiments thereof, but it will be understood that variations and modifications can be effected within the scope of the invention.

PARTS LIST 40 computer
104 AM dots placement
108 FM dots placement
112 void dots
116 void dots
204 digital front end (DFE)
208 imaging device
212 interface line
300 imaging system
304 rotating cylinder
308 substrate
312 imaged data on substrate
316 screw
320 imaging head
328 controller
332 carriage
400 rendered halftone image to be imaged on substrate
500 rendered image imaged on substrate
604 highlights
608 shadows
612 mid-tones
616 low values extending into shadows
804 a cell threshold values construction
808 dither magnitude curve
812 displacement vectors
816 screening component according to threshold values
820 contone image
824 halftone image
900 screening tile
904 pixel
908 halftone dot
912 halftone cell
1000 a cell threshold values
1004 pixels under 19% tone will be set

The invention claimed is:

1. A method of forming a screened image comprising:
   providing a contone image;
   providing a screening tile structure of M by N cells;
   providing a dither magnitude curve;
   providing a spot function for each of the cells in the screening tile;
   providing a displacement vector for each of the cells in the screening tile;
   constructing threshold values for each of the cells by displacing the center of each cell spot function according to the displacement vectors and according to the dither curve;
   constructing a halftone image from the contone image and the screening tile by comparing value of each pixel from the contone image to a corresponding threshold value from the screening tile; and
   if the pixel value exceeds the threshold value set a corresponding pixel in the halftone image to one otherwise set the corresponding pixel in the halftone image to zero.

2. The method of claim 1 wherein each halftone dot moves toward the center of the each cell as each halftone dot grows.

3. The method of claim 1 wherein each halftone dot remains entirely within the cell boundaries as it grows.

4. The method of claim 1 wherein a magnitude of dithering is greater in highlight areas than in mid-tone regions.

5. The method of claim 1 wherein the tile is smaller than the halftone image.

6. The method of claim 5 comprising:
   replicating the tile throughout the digital image to form a screened image.

7. The method of claim 5 comprising:
   printing the screened image on a media.

8. The method of claim 1 comprising:
   adjusting dithering at tile boundaries to reduce artifacts when a tile is replicated.

9. The method of claim 1 comprising:
creating displacement vectors for the cells in the screening tile by a stochastic process.

10. The method of claim 9 comprising:
optimizing stochastic method to produce displacement vectors that minimize low frequency noise.

11. The method of claim 1 wherein M is an integral.
12. The method of claim 1 wherein N is an integral.
13. The method of claim 1 wherein N equals to M.
14. The method of claim 1 wherein N is not equal to M.

* * * * *